Sept. 1, 1936. D. R. DE TAR 2,052,701
DIAL MECHANISM
Filed July 16, 1935 3 Sheets-Sheet 2

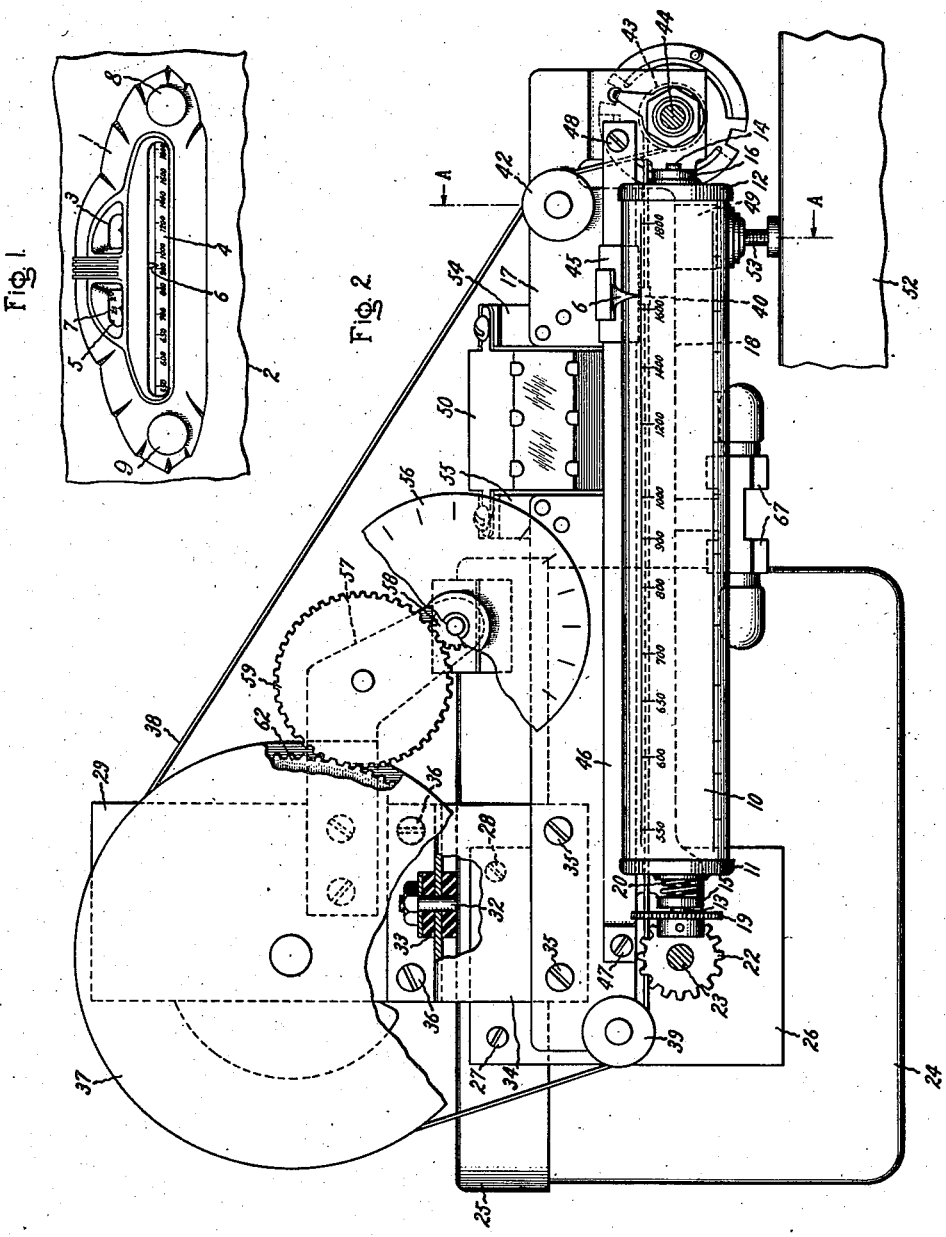

Inventor:
Donald R. De Tar,
by Harry E. Dunham
His Attorney.

Patented Sept. 1, 1936

2,052,701

UNITED STATES PATENT OFFICE 2,052,701

DIAL MECHANISM

Donald R. De Tar, Stratford, Conn., assignor to General Electric Company, a corporation of New York Application July 16, 1935, Serial No. 31,605

13 Claims. (Cl. 116—124.1)

My invention relates to dial mechanisms for radio apparatus, and particularly for radio receivers adapted for multiband reception. It has for one of its objects to provide such a mechanism including one or more dials, and controls therefor, arranged in a unitary structure and provided with means whereby it may be mounted with respect to the necessary cabinet apertures with facility and accuracy.

A further object of the invention is to provide such a mechanism which is simple in construction, economical to manufacture, and which possesses the advantage that but a single one of the multiband scales is visible at a time.

A further object of the invention is to provide economical means associated with said unitary mechanism whereby the various scales are uniformly illuminated.

Still a further object of the invention is to provide such a unitary structure of the type indicated which is adjustable in position as a unit to secure alignment of the scales and cabinet apertures without adversely affecting the operation of the driving means for the tuning element and dial mechanism of the apparatus.

Figure 3:
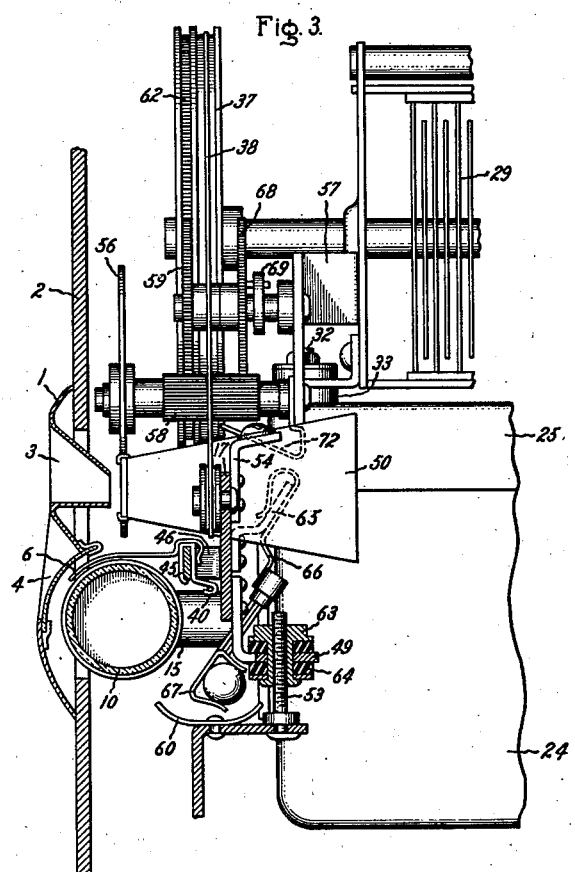
Figure 5:
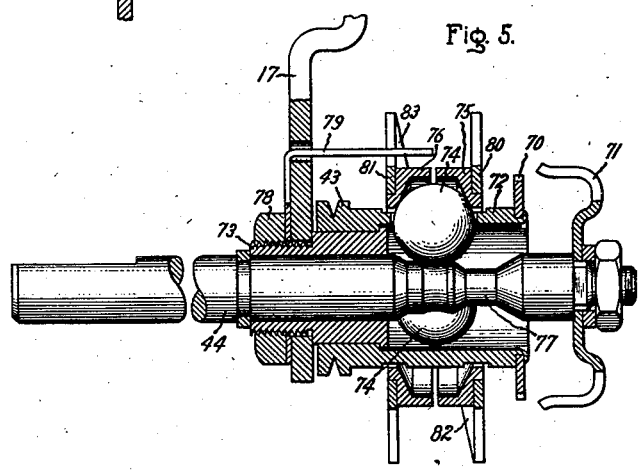
Figure 4:
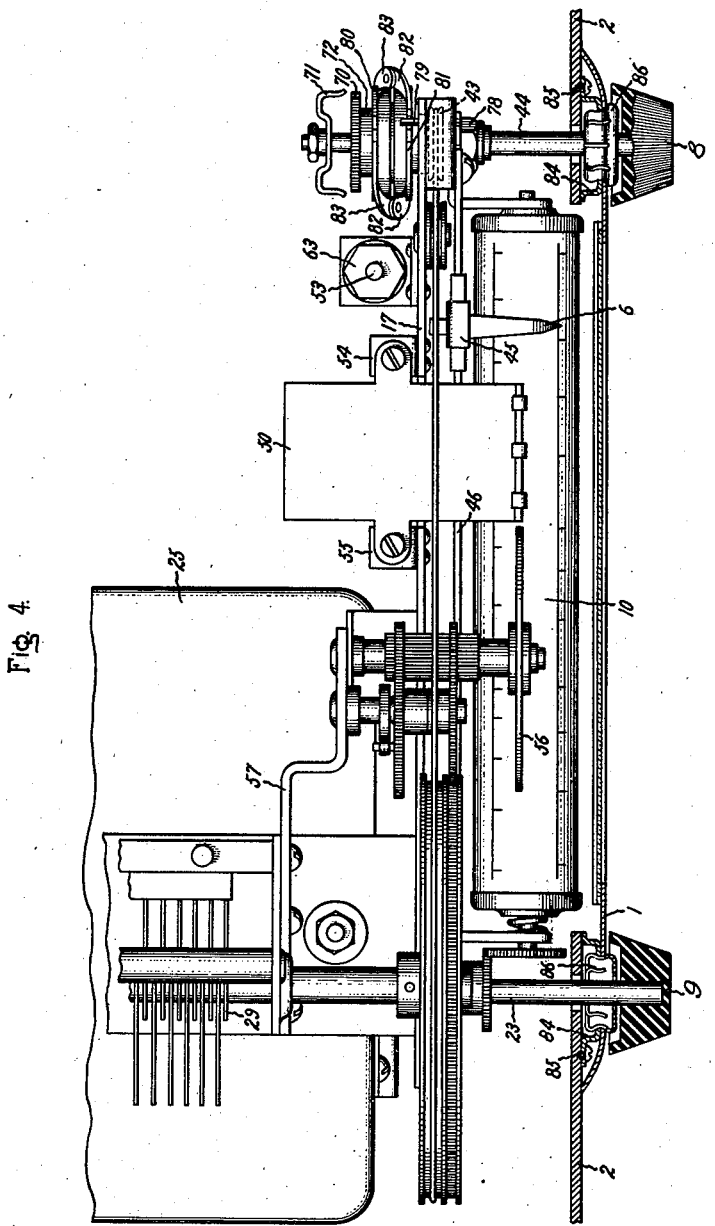

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 shows an escutcheon plate through which the indications produced by apparatus provided in accordance with my invention are viewed; Fig. 2 is a front elevation of apparatus provided in accordance with my invention; Fig. 3 is a view partially in section of Fig. 2; Fig. 4 is a plan view; and Fig. 5 illustrates a detail thereof.

Referring to Fig. 1, I have indicated at 1 an escutcheon plate mounted upon the panel 2 of a radio receiver in connection with which my invention may be employed. This escutcheon plate has three openings 3, 4, and 5 therein, through which the indications provided by the equipment to be described may be viewed. The opening 3 is provided for a tuning meter, for example, that is a meter for indicating when the receiver is in resonance with a received carrier wave. The opening 4 is provided for the tuning scale of the instrument and its cooperating index 6 which is movable over the scale in accordance with the frequency to which the receiving equipment is resonant, and the aperture 5 is provided through which to view an additional scale 7 which is arranged as will later be described for movement in accordance with the movement of the index 6 but in amplified relation thereto to provide a vernier indication.

At the front of the escutcheon plate are mounted two knobs 8 and 9, the knob 8 being provided for tuning the radio receiving equipment in any band and simultaneously to move the index 6 and the scale 7 in accordance with the frequency to which the equipment is tuned. The knob 9 is provided for the purpose of changing the scale visible through the aperture 4 to correspond with the frequency band over which the equipment is adjusted for operation.

It will be observed that this escutcheon plate 1 with the apertures and service knobs 8 and 9 arranged therewith is one which can be provided upon the front of a radio cabinet without restricting the latitude of the cabinet designer in producing a cabinet of beauty. The arrangement of the various indication apertures and service knobs relative to each other is such as to serve as an aid to the cabinet designer. The equipment constructed in accordance with my invention provides for such an arrangement while effecting at the same time certain economies and operational advantages by reason of this arrangement.

Fig. 2 shows the equipment mounted within the cabinet behind the panel carrying the escutcheon plate 1. This equipment comprises the tuning dial 10 in the form of a translucent cylinder having different parallel scales marked longitudinally thereon, these scales corresponding to the different frequency bands over which the equipment is designed to operate. The ends of the cylinder 10 are closed by metallic disk members 11 and 12, these disk members being centrally provided with outwardly projecting shafts 13 and 14 which project respectively through ears 15 and 16, which are pressed up from a bracket 17. This bracket 17 extends back of the cylinder and throughout the entire length thereof and beyond its ends, its periphery being clearly indicated by lines in Fig. 2. The lower edge of this bracket member is indicated by the dotted line 18 of Fig. 2. The cylindrical scale carrying member 10 is mounted between the ears 15 and 16 of this bracket and arranged for rotation therein, the disks 11 and 12 being pressed against the ends of the translucent cylinder by means of coil spring 20 between ear 15 and disk 11. If desired, of course, the disks 11 and 12 may be annularly grooved to receive the ends of the cylinder 10, or they may otherwise be suitably attached to the cylinder. The shaft 13 of disk 11 is provided with a gear 19 which cooperates with the gear 22 on the band change shaft 23 of the radio apparatus, this shaft being provided with the knob 9 shown in Fig. 1 by which it, together with the band change mechanism, of the receiving equipment and the scale carrying member 10 are rotated. Play, or back lash between these gears is taken up by spring 20, one end of which is attached to the ear 15 and the other end to the disk 11, the arrangement being such as to bias the cylinder for rotation. The action of the band change mechanism, however, resist this tendency to rotate. The scale thus revealed through the aperture 4 corresponds to the band over which the receiving equipment is adjusted to operate.

The band changing mechanism operated by the shaft 23 is housed within the casing 24 which is provided with a cover 25 and is supported therein by means of a bracket 26 which is rigidly attached to the cover 25 by means of screws 27 and 28, whereby the casing 24 is removable.

The tuning element of the apparatus which may comprise a condenser 29 is mounted on the cover 25 of the equipment by means of flexible supports 32, and 33, only one of which appears in the drawings. The bracket 17, which supports the cylindrical scale 10, is rigidly attached to the condenser 29 by means of a bracket 34, the lower end of which is attached to the bracket 17 by means of screws 35, and the upper end of which is attached to the condenser 29 by means of screws 36. This bracket is flexibly attached to the cover 25 by bolt 32 provided with soft rubber washers, or cushions 33 on either side of the bracket. Thus the scale mechanism is rigidly attached to the condenser, and together therewith is flexibly supported from the chassis of the apparatus by the supports, comprising washers 33, one of which supports may be provided at each end of the condenser.

The condenser 29 is provided with a pulley 37 over which, or attached to which, for example, in the manner shown in my Patent No. 1,830,595 issued November 3, 1931, or Mapelsden Patent 1,860,151 issued May 24, 1932, is a belt 38, the latter of which extends over idler pulleys 39 and 42, and a driving pulley 43, all supported on the bracket 17. The driver pulley is arranged to be driven by a shaft 44 upon which is mounted the service knob 8 shown in Fig. 1 whereby the receiving equipment is tuned and whereby the index 6 is moved along the scale carrying member. This index is mounted upon a carrier 45 which is provided with a clip 40 which is clamped to the belt 38. This carrier 45 slides upon a member 46 which is attached at its opposite ends to the bracket 17 by means of screws 47 and 48.

The pulleys 43 and 39 are so positioned upon the bracket 17 that the belt extending between these pulleys extends parallel to and in back of the cylindrical scale carrying member 10 and parallel with the slide 46 whereby the rider 45 rides along the slide 46 in accordance with the movement of the belt. The index member 6 which rides on the carrier 45 is in the initial manufacture of the equipment, made separate from the rider 45, to be slidable longitudinally thereof, and is attached thereto, as by soldering only after being adjusted to its exact position relative to the scale, as determined by test.

The bracket 17 is provided near its righthand end but behind the scale carrying member 10 with a downwardly projecting foot-like member 49, indicated in Fig. 2 only by dotted lines, but more clearly indicated in Fig. 3. The foot of this member is supported from a fixed portion of the apparatus 52 by means of an adjustable screw 53 whereby the right end of the equipment may be moved upwardly and downwardly to align the scale carrying member 10 with the aperture 4 during the assembly of the equipment. It will be observed that during this adjustment of the equipment the different pulleys, and in fact all of the components of the dial operating equipment, are maintained in fixed relative position with the exceptions of the gears 19 and 22. These gears, however, are of a form which loosely engage each other and they are so positioned relative to the adjustable screw 53 that a considerable amount of adjustment of the scale mechanism may be effected without moving the gear 19 out of satisfactory operating engagement with the gear 22.

The bracket 17 is also provided with upwardly extending arms 54 and 55 on which are carried the tuning instrument 50, this instrument being positioned in a notch cut in the upper portion of the bracket 17 and arranged for alignment with the aperture 3 of Fig. 1. This instrument may be one of suitable type such as the shadowgraph shown in application Serial No. 633,983 Ralph G. Arey, filed September 20, 1932, or one of the laddertype shown in application Serial No. 710,669, filed February 10, 1934 by Ralph G. Arey both of which are assigned to the same assignee as my present application.

The scale 7 of Fig. 1 is shown in Fig. 2 as marked about the periphery of a disk 56. This disk is supported from the condenser 29 by a bracket 57 whereby its position relative to the scale member 10 is also maintained fixed irrespective of adjustments by means of the screw 53. This disk 56 is geared to the pulley 37 by means of gears 58, 59, and 62 whereby it is operated in fixed relationship to the movement of the index 6 along the scale 10 but in amplified relation thereto, thereby providing an indication for use in connection with accurate adjustment of the tuning.

Fig. 3 is a sidewise view partially in section along the line A—A of Fig. 2. This view shows the bracket 17 with an ear 15 at the remote end to support the scale carrying member 10.

This view also shows somewhat more clearly the position and arrangement of the slide member 46 upon which the rider 45 slides, and also the index member 6 carried by the rider 45. The foot member 49 attached to the member 17 is shown as supported by a screwthreaded sleeve 63 on the screw 53, soft rubber washers, or cushions 64 being provided about the sleeve upon either side of the foot 49, the sleeve 63 being headed at both ends to retain the washers and foot member in place. Thus upon rotation of the sleeve 63, as by means of a wrench, the bracket 17 is moved upwardly and downwardly relative to the fixed portions of the equipment.

Mounted upon the bracket 17 beyond the tuning instrument 56 is the member 65 projecting upwardly and rearwardly. To this member is clamped a support 66 for a pair of lamp sockets 67, the position of the latter of which are somewhat more clearly indicated in Fig. 2, small lamps being indicated as screwed into each of these sockets and projecting in opposite directions therefrom. These lamps are positioned somewhat rearwardly and below the translucent scale carrying member 10 whereby light emanated from the lamps illuminates the scale which is visible through the aperture 4 only after traversing the rear wall of the cylinder whereby it is widely diffused and caused evenly to illuminate the visible scale. A reflector 60 is provided to reflect the emanated light upwardly and in the direction of the scale carrying member 10. The support 66 for the lamps is easily mountable and demountable upon the bracket 65 and if desired may be provided with a handle to facilitate its removal and replacement.

Fig. 3 also shows mechanism for taking up back-lash in the gears 58, 59, and 62, this mechanism comprising an additional gear 68 which cooperates with the gear 58 and which is biased for rotation in a particular direction by coil spring 69 whereby it retains the gears 58, 59, and 62 in rigid engagement, any play or back-lash being removed. It will be noted that this mechanism is likewise mounted upon the bracket 57 which is attached to the condenser 29 whereby it is retained in position with respect to the gears with which it coacts.

It is desirable to provide means whereby the portion of the disk 56 visible through the aperture 5 is illuminated. To this end a reflector 72 is provided whereby light from the lamps mounted in the sockets 67 is reflected upon the back portion of the translucent disk 56.

The flexible support involving the rubber washers 33 is shown in Fig. 3 at the left end of the condenser. A second such support, not shown, is provided at the opposite end of the condenser.

The profile of the escutcheon plate 1 is clearly indicated in Fig. 3 from which it may be observed the scales and indicia are readily observable by the operator when either in a standing or sitting position. Suitable transparent closure members may if desired be employed to close any of the apertures.

Fig. 4 is a plan view of the equipment and more clearly shows the upper end of the sleeve 63 which is adjustable upon the screw 53, as by means of a wrench, to adjust the dial mechanism for alignment with the apertures.

The driving pulley 43 for the mechanism may be operated from the shaft 44 in any desired way, one suitable means involving balls in an epicyclic arrangement as shown in my Patent 1,995,171 issued March 19, 1935. Such means provides a suitable step-down ratio between the movement of the shaft 44 and that of the pulley 43. In order to provide a direct drive for the pulley 43 from the shaft 44 a gear 70 is provided for rotation with the pulley 43 and a member 71 is attached to the shaft 44 and adapted to engage this gear whereby upon movement of the shaft 44 outwardly, or downwardly in Fig. 4 the member 71 engages the gear 70 and causes rotation of the pulley 43 in a 1:1 ratio with respect to the shaft 44. Of course, in this position of the shaft 44 the reduction drive connection (not shown) is broken. Thus the tuning condenser, the index 5, and the dial 56 are all movable at two different speeds relative to the shaft 44 and dependent upon the longitudinal position of the shaft.

In Fig. 5 I have shown a sectional view of a particularly advantageous reduction drive mechanism which may be employed in connection with the pulley 43 and shaft 44. This reduction drive mechanism is described and claimed in my copending application Serial No. 34,423 filed August 2, 1935 entitled "Drive mechanism" and which is assigned to the same assignee as my present application. The pulley 43, it will be observed, is provided with a sleeve 72 having apertures therein in which balls 74 are arranged, these balls being held in position by means of two annular collars 75 and 76 arranged to form an outer ball race for the balls 74. These collars are held against rotation by means of a fixed member 79 attached to bracket 17. The two collars 75 and 76 are biased toward each other by ring members 80 and 81 having portions 82 and 83 bent toward each other and attached as may better be seen from Fig. 4. The inner points of each of the balls ride upon the circumference of the shaft whereby upon rotation of the shaft the balls rotate about the shaft carrying the sleeve 72 and thus causing rotation of the pulley 43.

To provide direct drive of the pulley 43 from the shaft 44 this shaft is provided with the length 77 of reduced diameter whereby upon movement of the shaft outward with respect to the panel the balls 74 drop into engagement with this reduced section of the shaft, and thus disengage the fixed ball race formed by the members 75 and 76. Thus the reduction drive connection is broken. In this position of the shaft the member 71 engages the gear 70 which is mounted on the sleeves 72 thereby to establish a direct connection between the pulley 43 and the shaft 44.

This drive equipment is shown as supported from bracket 17 to which it is secured by nut 78 on screw thread 73 on the bearing member of pulley 43.

Means for attachment of the escutcheon plate 1 to the panel 2 of the equipment is shown in Fig. 4, this means comprising annular members 84 which are attached to the panel 2 by means of screws 85, the two shafts 23 and 44 projecting through these annular members. By removal of the service knobs attached to these shafts, the escutcheon plate may be placed over these members 84 and secured thereto by snap fasteners 86, these fasteners being adapted by means of their resilient fingers to clamp the escutcheon plate to the annular members 84. The service knobs 8 and 9 may then be of any desired shape but preferably are so shaped as to conceal the fasteners 86. In this way all fastening means for the escutcheon plate are completely concealed.

While I have shown a particular embodiment of my invention, it will of course be understood that I do not wish to be limited thereto since many modifications both in the mechanical arrangement and the instrumentalities employed may be made, and I therefore contemplate by the appended claims to cover any such modifications as fall within the true spirit and scope of my invention.

What I claim as new and desire to secure by Letters Patent of the United States is:

1. A dial mechanism for radio apparatus comprising a cylinder having a scale extending longitudinally along the surface thereof, a single bracket extending the length of said cylinder and supporting said cylinder at its ends, said bracket being flexibly supported near one end of said cylinder from a rigid portion of said apparatus, and an adjustable support for said bracket near the opposite end of said cylinder.

2. In a dial mechanism for radio apparatus having a slit like opening through which the dial is viewed, the combination of a cylinder having parallel scales extending longitudinally thereof, a bracket extending the length of said cylinder and supporting said cylinder at its ends and in such position that a scale thereof is viewed through said opening, said bracket being flexibly supported near one end from a rigid portion of said apparatus, and a support for said bracket near its opposite end, said support being adjustable in a direction such that said cylinder may be aligned with said opening, and means to rotate said cylinder to select the scale to be viewed through said opening.

3. In combination, a radio apparatus, a tuning dial therefor, a housing, said tuning dial being visible through an opening in said housing, a tuning device for said apparatus having an element variable in position, an index movable along said dial in accordance with the position of said element and a driving means for said index, said dial and driving means being rigidly attached to said tuning element, flexible supports for said tuning element, and means to adjust the position of said dial to align with said opening, said tuning element, dial, index and driving means being movable as a unit to effect said alignment.

4. In combination, a radio apparatus, a tuning dial therefor, a housing, said tuning dial being visible through a relatively long and narrow opening in said housing, a tuning device for said apparatus having an element variable in position, an index movable along said dial in accordance with the position of said element and a driving means for said index and tuning element, a bracket rigidly attached to said tuning device, and supporting said dial, driving means and index, flexible supports for said tuning device, and means operating on said bracket to adjust the position of said dial for alignment with said opening.

5. The combination, in a band change dial mechanism for radio apparatus, of a cylinder having a plurality of parallel scales extending longitudinally thereof, a single index movable along said cylinder, a tuning device in said apparatus and driving means for said tuning device and index, a bracket rigidly attached to said tuning device and supporting said cylinder, driving means, and index, a rotatable band change shaft extending into said apparatus near one end of said cylinder, said driving means being located near the opposite end of said cylinder, an adjustable support for said bracket near said opposite end whereby the position of said cylinder may be varied, and means including a loose connection between said shaft and cylinder whereby said cylinder may be rotated in accordance with the position of said shaft for all conditions of adjustment of said adjustable support.

6. The combination of a cabinet having a translucent cylinder mounted therein, said cylinder having parallel scales extending longitudinally thereof and so positioned that one of said scales is visible through an opening in said cabinet, a source of light positioned at the rear of said cylinder whereby light from said source illuminates said visible scale after being diffused by the rear wall of said cylinder.

7. The combination of a cabinet having a translucent cylinder mounted therein, said cylinder having parallel scales extending longitudinally thereof and so positioned that one of said scales is visible through an opening in said cabinet, a source of light positioned at the rear of said cylinder whereby light from said source illuminates said visible scale after being diffused by the rear wall of said cylinder, an index movable along said visible scale, a dial visible through a second opening in said cabinet and movable in amplified relation to the movement of said index, and means to illuminate said dial from said source.

8. The combination in a dial mechanism for a multiband radio receiver, of a horizontal dial adjustable to indicate any one of a plurality of scales, an index movable along said dial to cooperate with any of said scales, a graduated disk, means to rotate said disk in amplified relation to the movement of said index, a tuning element in said receiver, and means to drive said tuning element to tune said receiver and simultaneously to move said index along said scale and to rotate said disk, said driving means, dial, disk, and index all being supported from said tuning element.

9. In combination, a tuning element, a cylindrical scale carrying member, a bracket attached to said tuning element and supporting said cylinder, a pulley on said tuning element, driving means carried on said bracket, said means comprising a rotatable driving pulley at one end of said bracket, an idler pulley at the opposite end thereof and a belt operating over said pulleys to rotate said tuning element in accordance with the rotation of said driving pulley, an index carrier on said belt to cooperate with a scale on said scale carrying member, a housing having an aperture through which said scale carrying member is visible, and means to adjust the position of said scale carrying member with respect to said aperture while maintaining said member and pulleys in fixed relation to each other.

10. The combination, in a dial mechanism for radio apparatus, of a longitudinal scale, a pulley located at each end of said scale, means to operate a tuning element in said apparatus, said means comprising a belt extending over said pulleys and substantially parallel with said scale, means to attach an index to said belt for movement therewith along said scale, said means comprising a carrier securely attached to said belt, and a rider on said carrier, said rider having said index for cooperation with said scale, said carrier being longer than said rider to permit adjustment of the rider along the carrier to a desired position on the scale while said belt remains stationary.

11. A dial mechanism for radio apparatus comprising a cylinder having a scale extending along the surface thereof, one end of said cylinder being flexibly supported from said apparatus and an adjustable support for the opposite end of said cylinder.

12. In a dial mechanism for radio apparatus having an opening through which the dial is viewed, the combination of a cylinder having a scale extending along the surface thereof, said cylinder being flexibly supported from said apparatus near said opening and adjusting means for positioning said cylinder in alignment with said opening, said means utilizing the flexure of the cylinder support.

13. In a dial mechanism for radio apparatus having an opening through which the dial is viewed, the combination of a cylinder having a plurality of indicia spaced along the surface thereof, said cylinder being flexibly supported near said opening, said cylinder being rotatable to permit view of desired indicia on said cylinder through said opening, adjusting means for positioning said cylinder in alignment with said opening, said adjusting means being adapted to move said cylinder with respect to said opening through a range permitted by the flexure of the cylinder support.

DONALD R. DE TAR.